United States Patent
Page et al.

[11] 3,774,507
[45] Nov. 27, 1973

[54] SPRING BRAKE UNITS

[75] Inventors: Wilbur Mills Page, Lincoln; Charles Thomas Riley, North Hykeman, both of England

[73] Assignee: Clayton Dewandre Company Limited, Lincoln, England

[22] Filed: Mar. 18, 1971

[21] Appl. No.: 125,597

[30] Foreign Application Priority Data
Mar. 26, 1970   Great Britain................... 14,752/70

[52] U.S. Cl. ................................................. 92/130
[51] Int. Cl. ............................................ F16d 65/24
[58] Field of Search ................ 92/63, 130, 64, 170, 92/171, 128; 188/170

[56] References Cited
UNITED STATES PATENTS

| | | | |
|---|---|---|---|
| 3,107,583 | 10/1963 | Woodward............................. | 92/63 |
| 3,401,606 | 9/1968 | Mathews et al.................. | 92/63 UX |
| 3,424,062 | 1/1969 | Gummer et al......................... | 92/63 |
| 3,086,745 | 4/1963 | Natho................................. | 92/130 X |
| 3,495,503 | 2/1970 | Gummer et al........................ | 92/63 |
| 3,179,055 | 4/1965 | Kalert................................ | 92/128 X |
| 3,188,048 | 6/1965 | Sutherland.......................... | 92/130 X |
| 2,215,546 | 9/1940 | Dick.................................... | 188/170 |
| 2,401,378 | 6/1946 | Smith................................... | 92/164 |
| 3,033,325 | 5/1962 | Tjernstrom .......................... | 188/170 |
| 3,250,183 | 5/1966 | Gephart.............................. | 92/130 X |
| 3,334,545 | 8/1967 | Houser................................ | 92/130 X |
| 3,462,986 | 8/1969 | Cox et al. ............................. | 92/63 |

Primary Examiner—Martin P. Schwadron
Assistant Examiner—Allen M. Ostrager
Attorney—Norris & Bateman

[57] ABSTRACT

A spring-actuated fluid pressure-released brake unit for use in a hydraulic braking system comprises a mounting plate embodying and supporting a hydraulic cylinder and piston assembly, an actuating spring and a spring relaxing device, the arrangement being such that all reaction to braking force is taken by the mounting plate so permitting the use of a lightweight shell or casing.

7 Claims, 1 Drawing Figure

PATENTED NOV 27 1973 3,774,507
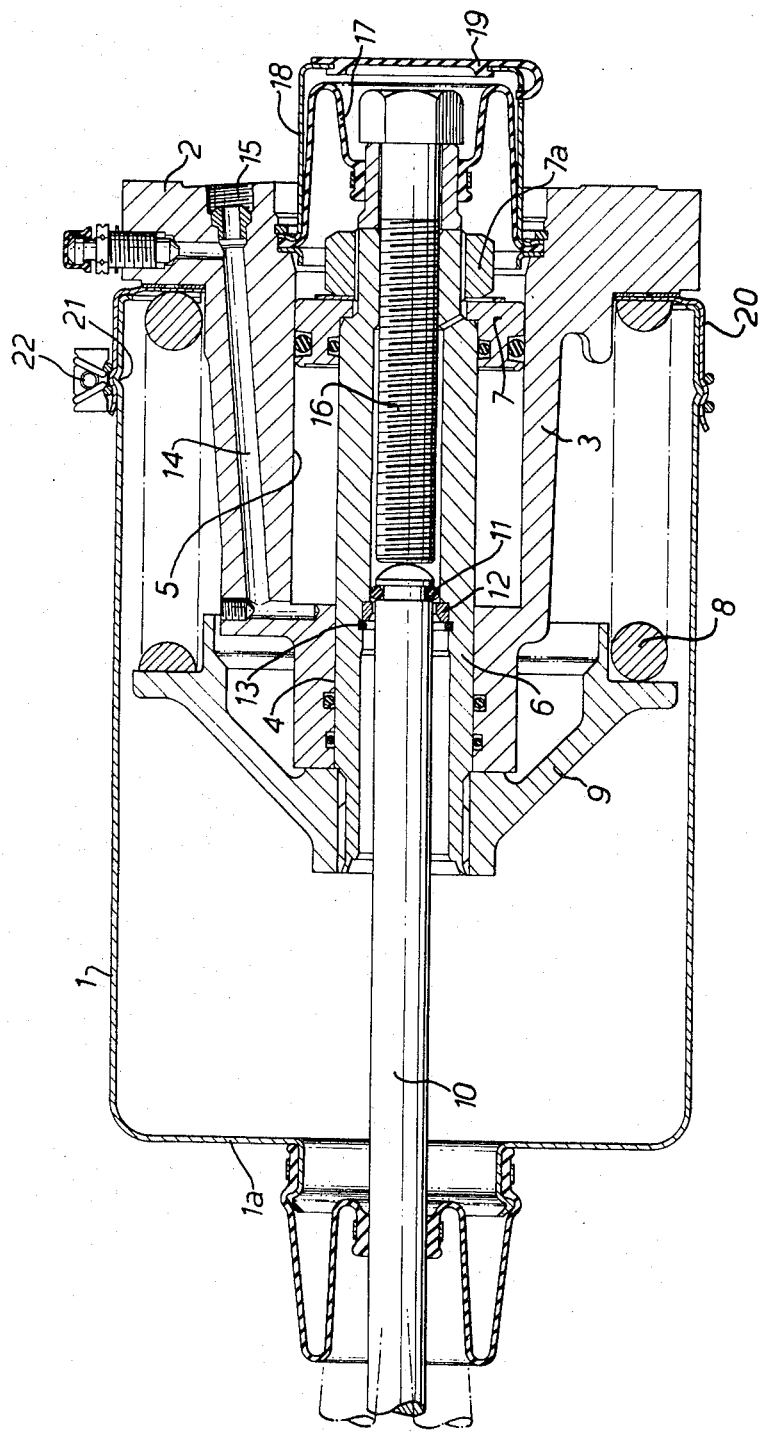
INVENTORS
WILBUR MILLS PAGE
CHARLES THOMAS RILEY
BY *Norris & Bateman*
NORRIS & BATEMAN

SPRING BRAKE UNITS

This invention relates to vehicle braking apparatus incorporating spring brake units, that is, brake units comprising a spring-loaded piston and cylinder device of which the piston is operatively connected to the brakes or brake linkage and is acted upon by a supply of pressurised fluid such that the piston is normally held in an inoperative position, but, upon failure of the fluid pressure supply, moves under the action of the loading spring to apply the brakes.

The present invention is concerned more particularly with braking systems where hydraulic pressure is used to hold the spring brake unit inoperative, the object of the invention being the provision of an improved form of unit in which the reaction of the applied braking effort is exerted directly on the mounting plate or flange of the unit, that is, it is not transmitted through the shell of the unit, with advantages in economy and rigidity.

According to the invention the improved spring brake unit comprises a shell or casing attached at one end to a mounting plate or flange having a hollow re-entrant portion extending into the shell and defining a hydraulic cylinder, a hollow piston rod guided for axial movement in said re-entrant portion and carrying a piston movable in the hydraulic cylinder, a coiled compression spring contained within the shell and loading the piston rod in one direction and a thrust rod having operative connection at one end with the piston rod and extending through the other end of the shell for connection to the brakes or brake linkage. Preferably the inner end of the thrust rod engages an abutment capable of controlled displacement along the piston rod thereby to relax the compression of the loading spring and provide manoeuvrability of a vehicle after automatic brake application following a hydraulic failure.

A preferred embodiment of the invention will now be described with reference to the accompanying drawing which is an axial section through the improved spring brake unit, said unit comprising an outer cylindrical shell 1 with an integral closure 1a at one end, the other end thereof being secured to a plate or flange structure 2 which serves to mount the unit on the framework of a vehicle. The mounting plate 2 includes a hollow re-entrant portion 3 which extends axially into the shell 1 and is of stepped formation to define two co-axial bores of different diameters 4, 5. Having sealed axial sliding movement in the smaller bore 4 is a hollow piston rod 6, whilst secured onto the end of said rod by a nut 7a is an annular piston 7 sliding in the larger bore 5 which constitutes a hydraulic cylinder. A heavy coil compression spring 8 is interposed between the mounting plate 2 and an abutment ring 9 secured to the inner end of the piston rod 6, whilst a thrust rod 10 extending through the closed end 1a of the shell is socketed into the inner end of the piston rod 6 to transmit the thrust thereof to the brake linkage. Brake actuating thrust rod 10 is continually biased toward the right in the drawing in the brake release direction by the usual brake return springs (not shown) in the brake linkage. To this extent the thrust rod is operated conventionally and similarly to the brake actuating rod disclosed in Gummer et al U.S. Pat. No. 3,424,062. In the arrangement shown a retaining ring 11 received in a peripheral groove in the thrust rod abuts a stop collar 12 located between a shoulder on the piston rod and a circlip 13 but any equivalent arrangement may be employed which will permit relative pivotal movement of the thrust rod relative to the piston rod. Formed in the mounting plate 2 and re-entrant portion 3 is a passage 14 by which the inner end of the hydraulic cylinder 5 is connected to a hydraulic supply port 15. Thus, in use, hydraulic pressure transmitted to the inner end of the hydraulic cylinder 5 will hold the hydraulic piston 7 in the retracted position shown against the action of the compressed loading spring 8, whilst a failure in the hydraulic circuit will result in a loss of pressure in the hydraulic cylinder so permitting the loading spring to expand and displace the piston rod and effect application of the brakes.

With the construction as so far described it will be apparent that the thrust rod 10 needs normally to be rigidly located relative to the piston rod 6 in order to transmit the thrust of the spring 8 to the brake linkage under emergency conditions. However, as previously mentioned, it is also desirable to be able to release the compression on the spring 8 to restore manoeuvrability to a vehicle after emergency application of the spring brakes and the present construction embodies a simple mechanism which achieves both objects. As shown, the outer end of the piston rod 6 is screw-threaded internally to receive a release bolt 16 the inner end of which normally abuts the domed inner end of thrust rod 10. The head of bolt 16 is located externally of the hydraulic cylinder 5, which is closed off by a flexible gaiter 17, said bolt head and the gaiter being enclosed by a sheet metal or plastics cap 18 detachably secured to the mounting plate 2 by a circlip or equivalent means. An opening in the outer wall of the cap 18 is closed by a removable rubber or plastics cover 19 and thus when it is required to relax the spring compression after an emergency brake application it is merely necessary to uncover the head of the release bolt 16 and to unscrew the bolt. Initially, such unscrewing of the bolt will allow the thrust rod 10 under the influence of the usual brake return springs to follow in abutment with the inner end of bolt 16 and travel along the hollow piston rod 6 and, as the spring is released, the hydraulic piston 7 travels along the cylinder 5 toward the end wall thereof. Further unscrewing of the bolt 16 allows the thrust rod 10 to continue its movement along the piston rod 6 until a sufficient effort is relaxed from the brakes or brake linkage to allow vehicle mobility.

When the brakes are applied by loading spring 8 under the emergency condition represented by failure of pressure in the hydraulic cylinder, the piston 7 moves to the left in the drawing. It normally does not travel the entire length of cylinder 5 but is moved only sufficiently to apply the brakes. Thus, the brakes having been applied, there is still adequate room for further travel of the piston relative to the thrust rod to release the thrust rod from the force of loading spring 8. Actually in practice the piston 7 would almost never abut the end wall of cylinder 5 because energization of spring 8 would be released before the piston reached that positon.

The spring relaxing device is also of considerable assistance when fitting the spring brake unit to or removing it from a vehicle in that all load can be relaxed when required to facilitate assembly or dismantling of yokes, pins and equivalent linkage connections, the spring loading being restored when desired without any danger to the operator.

As the whole of the mechanism is carried on and supported by the mounting plate 2 it will be apparent that all braking reaction is taken by said plate and the casing 1 which merely acts as a protective cover may therefore be of relatively light construction. In the embodiment shown the casing which is formed of a plastics material or of sheet metal has a push fit into an expanding pressed steel retainer 20 secured to the mounting plate 2, the casing having a moulded-in beading 21 which snaps into a complementary groove in the retainer and the casing being locked in this position by a releasable wire type clip 22 or any equivalent means.

We claim:

1. A spring brake unit for use in a vehicle braking system comprising a hollow member containing a hydraulic cylinder, a piston slidable in said cylinder, a hollow piston rod fixed to said piston and axially slidably extending through one end of said member, a compression spring disposed between said member and said piston rod, said spring being compressed to energized condition when said piston rod is moved in the brakes-off direction by hydraulic fluid pressure in said cylinder, and said compressed spring in the absence of predetermined hydraulic pressure in said cylinder acting to displace said piston rod in the brakes-on direction, means providing an axial abutment within said piston rod, a vehicle brake actuating thrust rod extending through said hollow piston rod into operative engagement within said abutment, and means accessible at the other end of said member for effecting controlled displacement of said abutment along the piston rod toward said other end of said member thereby permitting said thrust rod to follow the abutment and move in the brakes-off direction.

2. The spring brake unit defined in claim 1, wherein said member comprises a mounting plate for attachment to vehicle structure and a hollow projection on said plate containing said hydraulic cylinder.

3. The spring brake unit defined in claim 1, wherein said member is a mounting plate and a shell enclosing said piston rod and spring is removably secured to said plate, said plate having a reentrant hollow portion extending within the shell and containing said hydraulic cylinder, said piston rod at one end being slidable in said reentrant position, and said thrust rod extending slidably through said shell into said hollow piston rod.

4. The spring brake unit defined in claim 3, wherein said piston rod has a flange at its said one end outside the reentrant portion of said member, and said spring is a coiled spring extending between said flange and said mounting plate.

5. In the spring brake unit defined in claim 1, said abutment having a screw threaded mounting within said piston rod and having an operating head outside the piston rod.

6. A spring brake unit as defined in claim 5, wherein said abutment is a bolt threadedly mounted within said hollow piston rod, and a removable cover is provided on said member providing access to the bolt head.

7. A spring brake unit as defined in claim 3, said shell being of relatively light weight plastics or sheet metal.

* * * * *